Aug. 19, 1969
V. H. GREEN
3,461,596
FLOAT AND CASTING DEVICE
Filed Dec. 22, 1966
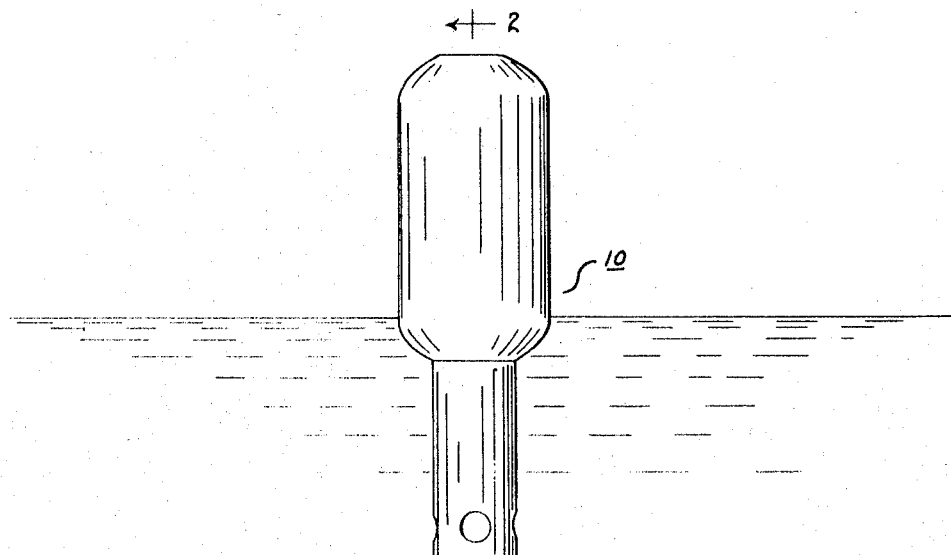
FIG. 1
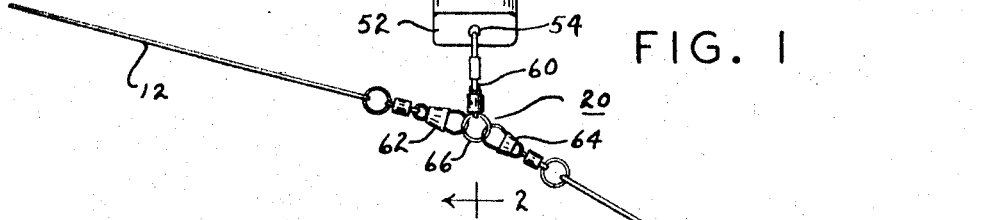
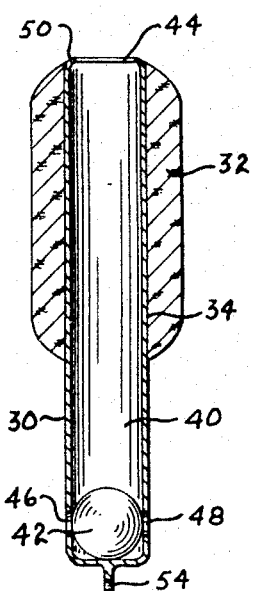
FIG. 2
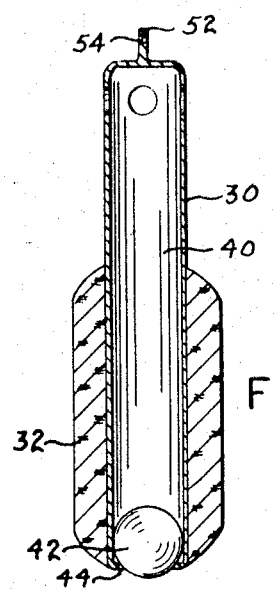
FIG. 5
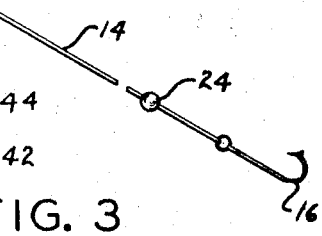
FIG. 3
FIG. 4
INVENTOR.
VERLAND H. GREEN
BY
M. A. Hobbs
ATTORNEY

United States Patent Office 3,461,596
Patented Aug. 19, 1969

3,461,596
FLOAT AND CASTING DEVICE
Verland H. Green, 1602 Fox Farm Road,
Warsaw, Ind. 46580
Filed Dec. 22, 1966, Ser. No. 603,895
Int. Cl. A01k 93/00, 91/02
U.S. Cl. 43—43.1      8 Claims

ABSTRACT OF THE DISCLOSURE

A float and casting device for a fishing line including an elongated tubular member with a solid weight slidably disposed therein and a float around the member near one end thereof. The weight is moved to the float end during casting and is automatically moved to the other end to upright the float when it is placed in the water.

---

Some floats used in fishing are rather light and have little effect on throwing or casting the line. Further, because of the light weight and poor control afforded by many different line hook-ups, the prior lines have been easily blown away from the desired location before the hook and line reach the water as they are being thrown. It is therefore one of the principal objects of the present invention to provide a device which can be attached to the fishing line for assisting in throwing or casting the line in the desired location, and which functions effectively as a float after the line is in the water.

Another object of the invention is to provide a device of the aforesaid type which increases the leverage and force available for throwing a fishing line so that it can be placed accurately within a wide range of distances and over an extended area, and which uprights itself to serve as a float when it drops into the water upon completion of the cast.

Still another object is to provide a relatively simple and easily handled float and casting device which is so constructed and arranged that it assist in maintaining the line in an untangled condition while the line is being thrown, and which permits the sections of the line on opposite sides of the device to be, in effect, connected directly without interference by the float when a fish is being landed.

Additional objects and advantages of the invention will become apparent from the following description and accompanying drawings, wherein:

FIGURE 1 is an elevational view of the present float and casting device showing it in position in the water after it has been cast or thrown, showing the manner in which the fishing line is attached to and used with the present device;

FIGURE 2 is a vertical cross-sectional view of the present device, the section being taken on line 2—2 of FIGURE 1;

FIGURE 3 is a top plan view of the device;

FIGURE 4 is a bottom elevational view of the device; and

FIGURE 5 is a vertical cross-sectional view similar to the view seen in FIGURE 2, but illustrating the manner in which the present device is cast or thrown with the line attached.

Referring more specifically to the drawings, numeral 10 designates generally the present float and casting device, 12 a section of the fishing line connecting the device with a fishing pole, and 14 a section of the fishing line connecting the device with a fishing hook 16. The linkage for connecting the line to the float, indicated by numeral 20, may be of any suitable type, preferably of the type permitting the force on the fishing line beween sections 12 and 14 to, in effect, bypass the float and operate directly on the two sections. FIGURE 1 shows the device uprighted in the water in the position normally assumed when the device, line, sinker 24 and hook 16 have been placed in the desired location in the water, in the manner to be hereinafter described.

The present float and casting device consists of a tubular member 30 and a float 32 surrounding tubular member 30 and attached thereto along the upper half of the tubular member. The float 32 may be of any suitable substance, such as balsa, cork, plastic or a hollow shell filled with air, which is capable of giving adequate support to tubular member 30. The float is secured by waterproof cement or other suitable securing means to the tubular member which passes through central opening 34 of the float and terminates at the upper end of the float in substantially a flush relationship. The float may be given a waterproof coating and any ornamental configurations which normally are found on float type devices and which render the device readily visible while it is in the water.

Tubular member 30 preferably has a constant internal diameter forming elongated chamber 40, and contains a ball 42 which is preferably nearly the same diameter as the internal diameter of the tube, yet sufficiently smaller that it will roll readily from one end of the tubular member to the other. The ball is preferably made of a non-corroding metal such as brass, and is preferably relatively heavy so that it will readily upright the float into the position shown in FIGURE 1 after the line and device have been placed in the water in the fishing location. The tubular member which is preferably aluminum or brass, but which may be made of plastic or coated steel, has an opening 44 at the top and holes 46 and 48 near the bottom. These holes permit the water to flow readily into and from the tube and do not interfere with the movement of the ball from one end of chamber 40 to the other. One or more balls may be used if required to upright the tubular member 30 after the device has been placed in the water. If a plurality of balls is used, all of the balls must move freely from one end of the tube to the other as the tube is cast and placed in the water. Opening 44 is restricted by an inwardly extending flange 50 which is rolled onto tubular member 30 after the ball or balls 42 have been inserted in chamber 40. The lower end of the tubular member is provided with an extension 52 having a hole 54 therein for attaching to a part of linkage 20.

Linkage 20 consists of three swivel hooks 60, 62 and 64 joined together by ring 66, hook 60 being attached to extension 52 and extending through hole 54 and hooks 62 and 64 being connected to the lower end of hook 60. This type of linkage permits free movement of line sections 12 and 14 and the float either in cooperation with one another or independently thereof. As seen from the drawings, sections 12 and 14 are in a substantially direct line without any appreciable interference from the float device.

In the use of the present float and casting device the fishing line is assembled and connected to the float in the manner shown in FIGURE 1, and the hook is baited. The fisherman then holds the fishing pole in such a manner that the line hangs therefrom with the float hanging on the line in an inverted position, i.e., as shown in FIGURE 5, with opening 44 down and the ball adjacent thereto. With the float device weighted in this manner, the fisherman throws, or casts the line and float, sinker and hook, by a sweeping movement of the arm and pole, thus giving good leverage on the device for effectively throwing over the line into the water at the desired location. When the float and line sections have been thrown and while the float is in the air, the float device travels with ball 42 near opening 44, thus causing the device to travel with that end forward and thereby pulling the line from the other end through linkage 20. After the float hits the water, and a small return motion is given to it, the exposed end of tubular member 30 sinks into the water, permitting ball 42 to roll readily into that end, thus uprighting the device to the position shown in FIGURE 1 and permitting the line sections 12 and 14, sinker 24, and hook 16 to settle downwardly to their normal fishing position.

With the float in its uprighted position and the ball adjacent holes 46 and 48, the float will remain in or readily return to this position while the line is in the water. If the float is pulled beneath the water, it will return promptly to the surface, when released in its vertical position, and will bob conspicuously, causing it to be easily spotted by the fisherman. When a fish is caught on hook 16 and the line is pulled, a direct force is applied from the fishing pole to the hook through linkage 20 without any interference from the float, thereby giving the fisherman effective control throughout the entire length of the fishing line.

With the present type of float, it is possible to throw the line, hook and float a substantial distance and still maintain a reasonable length of untangled leader without weighting the leader. Another advantage of the present device is that it is easy to disconnect and change from one type of hookup to another and to get the bait down to different depths by regulating the speed of retrieving. It is possible to see the float readily at substantial distances, particularly if the line is pulled, since pulling or jerking on the line by the fisherman will cause the float to submerge and then immediately return upwardly to and bob at the surface. These and other advantages are inherent in the present float.

While only one embodiment of the present invention has been described herein, various modifications and changes may be made to satisfy requirements. The tubular member may be made substantially longer and a different type of float structure, such as a ball or disc shaped structure, may be used in place of the more cylindrically shaped structure shown in the drawings.

I claim:

1. A float and casting device for a fishing line comprising an elongated tubular member with a chamber therein and at least partially closed ends, a solid weight means of substantially shorter length than said tubular member freely movable from one end of said chamber to the other end, a float means disposed around said tubular member near one end thereof, said weight means moving to the float end of said tubular member which is substantially devoid of water when the device is cast, said weight means automatically moving to the end of said tubular member opposite said float means when said device is placed in the water to retain the float means at the top, and a means on the other end for securing the fishing line to said device.

2. A float and casting device for a fishing line as defined in claim 1 in which said weight means consists of a metal ball.

3. A float and casting device for a fishing line as defined in claim 1 in which the end of said tubular member adjacent the float means is open and said opening is restricted by an internally extending flange.

4. A float and casting device for a fishing line as defined in claim 2 in which the end of said tubular member adjacent the float means is open and said opening is restricted by an internally extending flange for restricting said opening to retain said ball in said tubular member.

5. A float and casting device for a fishing line as defined in claim 4 in which a plurality of holes is provided in the side wall of said tubular member near the end opposite said open end.

6. A float and casting device for a fishing line as defined in claim 1 in which said float means is generally cylindrically shaped and is firmly secured to said tubular member.

7. A float and casting device for a fishing line as defined in claim 3 in which said float means is generally cylindrically shaped and is firmly secured to said tubular member.

8. A float and casting device for a fishing line as defined in claim 7 in which said means for securing the fishing line to said device consists of a three-way linkage connected to two sections of the line and to the end of said tubular member for permitting the force of one section of the fishing line on one side of the tubular member to be transmitted directly to the section of the fishing line on the other side of the tubular member.

References Cited

UNITED STATES PATENTS

| | | | |
|---|---|---|---|
| 3,140,555 | 7/1964 | Gross | 43—43.15 X |
| 3,158,953 | 12/1964 | Filler | 43—43.14 |
| 2,004,414 | 6/1935 | Menefee | 43—43.1 |
| 2,739,408 | 3/1956 | Eatinger | 43—43.14 |
| 2,793,447 | 5/1957 | King | 43—43.14 |

SAMUEL KOREN, Primary Examiner

D. J. LEACH, Assistant Examiner

U.S. Cl. X.R.

43—43.14, 43.15, 44.84